Nov. 29, 1966   G. HIRS   3,288,296

FILTER SCREEN

Filed Nov. 8, 1963

INVENTOR.
GENE HIRS
BY
WILSON, SETTLE & CRAIG
ATTORNEYS

United States Patent Office 3,288,296
Patented Nov. 29, 1966

3,288,296
FILTER SCREEN
Gene Hirs, 17208 Greenview, Detroit, Mich.
Filed Nov. 8, 1963, Ser. No. 322,428
2 Claims. (Cl. 210—232)

This invention relates to filter screens, and more particularly to endless filter screen assemblies which are continuously or intermittently driven along an endless path during a filtering operation.

The screen assembly of the present invention is particularly adapted for use in traveling screen filters of the general type disclosed in my co-pending application Serial No. 322,153, filed November 7, 1963. In most filters of the type disclosed in my aforementioned application, an endless wire mesh screen is operatively trained about a series of suitably located rolls, one of the rolls being driven to drive the endless screen continuously or intermittently along the path established by the rolls. In roll driven screens, the driving force is applied to the screen at a single one of a plurality of rolls and thus the screen is subjected to a substantial tension while in operation. This tension is particularly acute at those points where the screen passes around direction changing rolls and when combined with the pressure differential across the filter screen, tends to stretch or deform the screen while it is in operation.

Further, the employment of an endless screen presents problems when the screen is damaged because damage to any part of the screen renders the entire screen useless until the damage is repaired. Repairing of the damage may require the replacement of the entire screen or may require that the screen be removed for repair and then replaced, which requires shutdown of the filter for substantial periods of time.

Accordingly, it is one object of the present invention to provide an endless traveling screen assembled in a manner such that no driving tension is applied to the screen itself.

It is another object of the invention to provide an endless screen assembly which may be readily repaired without requiring removal of the screen from the filter.

Other objects and features of the invention will become apparent by reference to the following specification and to the drawings.

Figure 1:
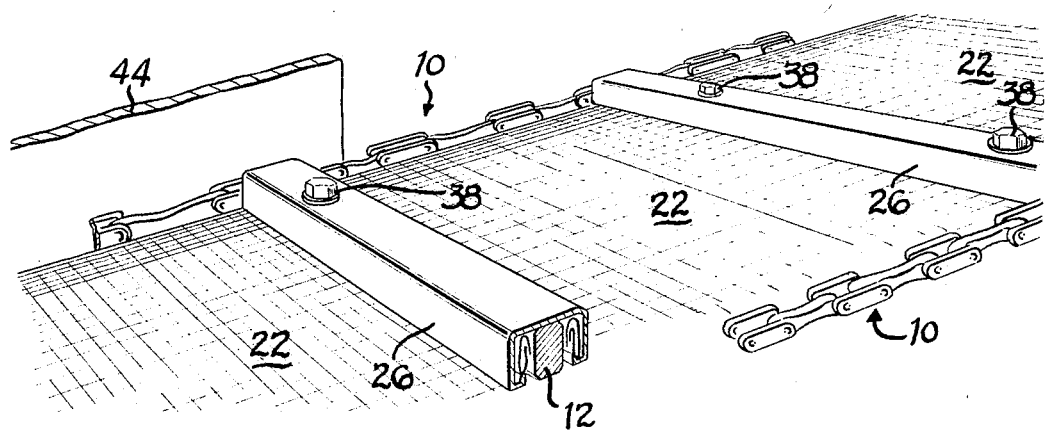
FIGURE 1 is a perspective view with certain parts broken away or shown in section of the portion of a filter screen embodying the present invention.
Figure 2:
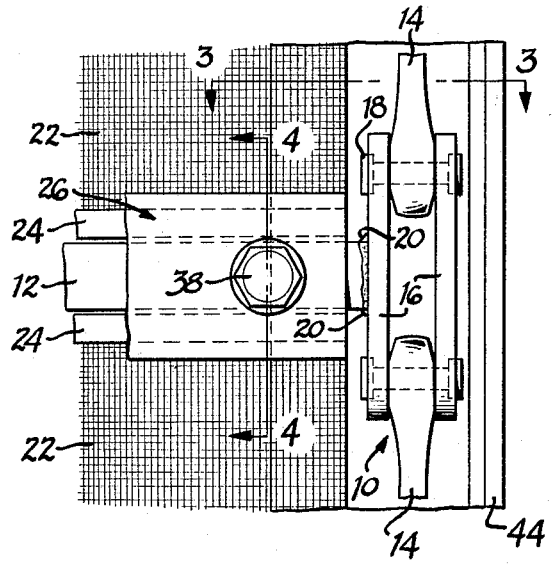
FIGURE 2 is a detailed top plan view of a portion of the screen of FIGURE 1 showing details of the interconnection of the various elements.

Referring first to FIGURE 1, a filter screen assembly embodying the present invention is constructed with a pair of spaced parallel drive chains 10 which are engaged with drive sprockets, not shown, in the filter assembly in which the screen is to be employed. At uniformly spaced intervals along chains 10, rigid cross bars 12 extend transversely between chains 10 and are secured to the chains for movement therewith. In the particular assembly shown in the drawing, chain 10 takes the form of a series of links 14 which are pivotally connected at each end to a pair of spaced side bars 16 as by chain pins 18 (FIG. 2). Cross bars 12 are fixedly secured to the respective chains as by weldments 20 which fixedly secure the ends of the cross bars to side bars 16 of the chain.

The filter screen is made up of a plurality of individual screen elements or sections 22, each screen section 22 being of rectangular shape with the width of each section being slightly less than the spacing between drive chains 10 and the length being slightly greater than the distance between adjacent cross bars 12.

Figure 4:
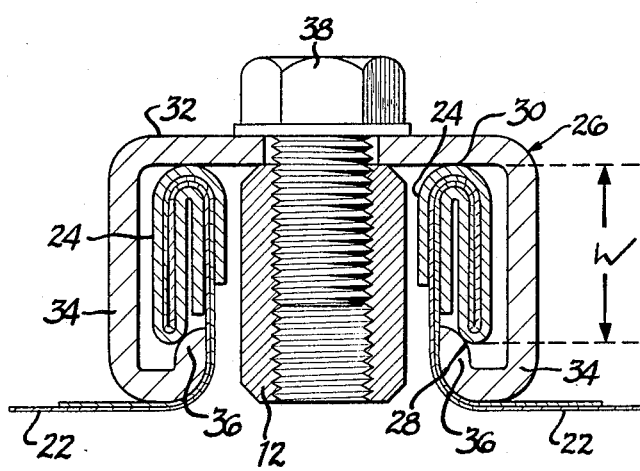
FIGURE 4 is a detailed cross sectional view taken on line 4—4 of FIGURE 2.

Referring now to FIGURE 4, the end edges of each screen section 22 are firmly clamped within a metallic reinforcing strip 24 which is folded back upon itself one or more times to achieve the desired amount of rigidity and area of clamping contact with screen section 22. Reinforcing strips 24 are permanently clamped to the opposite end edges only of the screen section, the side edges of the screen being unattached to any other elements. Aside from the requirement that the strip 24 have the required stiffness and firm clamping engagement with screen section 22, the width W (FIG. 4) of the reinforcing strip must have a definite relationship to certain dimensions of a coupling member 26 to be described below. Edges 28 and 30 of the strip are rounded, and edge 28 is offset from one side of the screen element for convenience in installation.

As indicated in FIGURE 4, coupling member 26 is adapted to frictionally clamp two reinforcing strips 24 to itself. Coupling member 26 includes a central web 32 and a pair of parallel side walls 34 which project downwardly from the lower side of web 32. At the lower end of each side wall 34, an upwardly projecting lip 36 is formed on the inner side of each side wall. The spacing between each lip 36 and the lower wall of web 32 is such that when edge 28 of reinforcing strip 24 is moved inwardly over the edge of lip 36, edge 30 of the reinforcing strip may then be swung upwardly into engagement with the lower side of web 32 to frictionally clamp the reinforcing strip between lip 36 and web 32 in the position illustrated in FIGURE 4.

Side walls 34 of coupling member 26 are so spaced from each other relative to the width of cross bar 12 that coupling member 26 may be fixedly secured as by bolts 38 to cross bar 12 with the side walls and reinforcing strips received therein disposed at opposite sides of cross bar 12. The spacing between each of lips 36 and the adjacent side of cross bar 12 is substantially less than the width W of reinforcing strips 24 so that when the parts are in the assembled position of FIGURE 4, the reinforcing strips are positively maintained against separation from the assembled cross bar and coupling member.

Figure 3:
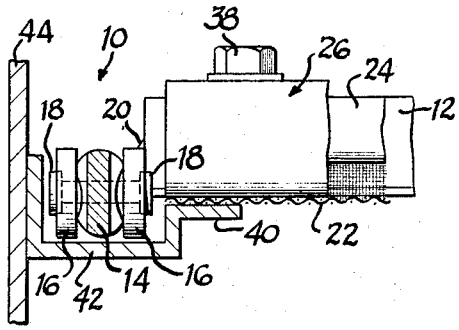
FIGURE 3 is a detailed cross sectional view taken on line 3—3 of FIGURE 2.

The side edges of screen sections 22 are free and unconnected to chains 10. To seal the screen assembly along its side edges, the screen is slidably engaged with a stationary flange 40 (FIG. 3) which may conveniently be located on a chain guide channel 42 mounted on a side wall 44 of a filter chamber in which the screen operates. The flange, channel and side wall are employed in conjunction with both of chains 10 and extend along the respective paths of the chains between the end sprockets at which a roll (not shown) may extend transversely between the end sprockets to perform the function of flanges 40.

In the assembled screen, the individual screen elements 22 are coupled to drive chains 10 only through the rigid cross bars 12. Thus, driving tension on the chain does not apply any tension to the screen elements.

In the event an individual screen element becomes damaged, it is easily replaced by disassembling the two coupling members 26 to which its opposite end edges are attached from the cross bars 12 and springing the respective reinforcing strips 24 free of the coupling members. A new screen element is then engaged with the two coupling members which are then reassembled to their respective cross bars 12 by replacing bolts 38.

While a specific embodiment of the invention has been described above, it will be apparent to those skilled in the art that the described embodiment may be modified. Therefore, the foregoing description is to be considered exemplary rather than limiting, and the true scope of the invention is that defined in the following claims.

I claim:

1. A filter screen assembly comprising a pair of spaced parallel drive chains, a plurality of elongate cross bars of uniform thickness extending transversely between said chains in parallel relationship with each other at uniformly spaced intervals along said chains, means securing the opposite ends of said cross bars to said chains for movement therewith, a plurality of screen elements having parallel end edges, a reinforcing strip fixedly secured to and extending along each of said end edges, a plurality of elongate coupling members each having a web and parallel side walls projecting from one side of said web, lip means on the inner side of each side wall for frictionally gripping a reinforcing strip between the lip means and said web, said lip means being transversely spaced from each other by a distance slightly greater than the thickness of said cross bar members, and means for detachably mounting said coupling members on said cross bars with the side walls and lip means of said coupling members disposed on opposite sides of said cross bars to positively retain said reinforcing strips in assembled relationship with said cross bars.

2. A filter screen assembly comprising a pair of spaced parallel drive chains, a plurality of elongate cross bars of uniform thickness extending transversely between said chains at parallel uniformly spaced intervals along said chains, means securing opposite ends of said cross bars to said chains for movement therewith, a plurality of screen elements having parallel end edges, an elongate reinforcing strip of uniform width fixedly secured to and extending along each of said end edges, a plurality of elongate coupling members each having a central web and spaced parallel side walls projecting from one side of said web, lip means on the inner side of each of said side walls in opposed relation to said web, said lip means being spaced from said web by a distance slightly less than the width of said reinforcing strip to frictionally clamp said reinforcing strip between said lip means and said web, means for securing each coupling member to one of said cross bars with the side walls of said coupling members disposed on opposite sides of said cross bars, the lip means on said side walls being spaced from the adjacent sides of the cross bar by a distance less than the width of said reinforcing strips to positively lock said reinforcing strips in position upon said cross bars with said screen elements extending between adjacent cross bars.

References Cited by the Examiner

UNITED STATES PATENTS

| | | | |
|---|---|---|---|
| 1,190,921 | 7/1916 | Leoni | 210—160 X |
| 1,564,451 | 12/1925 | Schroeder | 210—328 X |
| 1,815,137 | 7/1931 | Bleyer | 210—160 |
| 2,540,266 | 2/1951 | Johnson | 198—199 |
| 2,687,209 | 8/1954 | Rost et al. | 198—199 |

REUBEN FRIEDMAN, *Primary Examiner.*

SAMIH N. ZAHARNA, *Examiner.*